United States Patent
Downing

(10) Patent No.: US 8,819,152 B2
(45) Date of Patent: Aug. 26, 2014

(54) EMAIL ADDRESSEE VERIFICATION SYSTEMS AND METHODS FOR THE SAME

(76) Inventor: Kristy Joi Downing, Canton, MI (US)

(*) Notice: Subject to any disclaimer, the term of this patent is extended or adjusted under 35 U.S.C. 154(b) by 400 days.

(21) Appl. No.: 13/214,798

(22) Filed: Aug. 22, 2011

(65) Prior Publication Data

US 2012/0191786 A1    Jul. 26, 2012

Related U.S. Application Data

(60) Provisional application No. 61/436,183, filed on Jan. 25, 2011.

(51) Int. Cl.
*G06F 15/16* (2006.01)

(52) U.S. Cl.
USPC ............ 709/206; 709/223; 709/245; 715/752

(58) Field of Classification Search
CPC ......... H04L 51/32; H04L 51/00; H04L 51/12; H04L 51/18; H04L 51/30; H04L 12/585; H04L 63/1483; G06Q 10/107
USPC ............................. 709/206, 223, 245; 715/752
See application file for complete search history.

(56) References Cited

U.S. PATENT DOCUMENTS

| | | | |
|---|---|---|---|
| 6,212,553 B1 * | 4/2001 | Lee et al. ................... | 709/206 |
| 6,434,601 B1 * | 8/2002 | Rollins ...................... | 709/206 |
| 7,689,654 B2 | 3/2010 | Walter et al. | |
| 7,849,199 B2 | 12/2010 | Schulz | |
| 7,886,011 B2 | 2/2011 | Buchheit | |
| 2006/0212522 A1 * | 9/2006 | Walter et al. .............. | 709/206 |
| 2007/0143407 A1 * | 6/2007 | Avritch et al. ............ | 709/206 |
| 2009/0138711 A1 * | 5/2009 | Heimbigner ............... | 713/170 |
| 2009/0282039 A1 * | 11/2009 | Diamond .................... | 707/6 |
| 2010/0095377 A1 * | 4/2010 | Krywaniuk ................ | 726/22 |
| 2010/0205259 A1 | 8/2010 | Vitaldevara et al. | |
| 2010/0274860 A1 | 10/2010 | Hirota et al. | |
| 2010/0332508 A1 | 12/2010 | Gustafson et al. | |
| 2011/0016020 A1 * | 1/2011 | Emigh ....................... | 705/26.7 |
| 2011/0060796 A1 * | 3/2011 | Grigsby et al. ............ | 709/206 |
| 2011/0078260 A1 | 3/2011 | Rashad et al. | |
| 2011/0099235 A1 | 4/2011 | Koul et al. | |
| 2011/0119338 A1 | 5/2011 | Chen et al. | |
| 2011/0153752 A1 | 6/2011 | Seaman | |
| 2012/0158868 A1 * | 6/2012 | McAfee et al. ............ | 709/206 |

* cited by examiner

*Primary Examiner* — Oanh Duong
(74) *Attorney, Agent, or Firm* — Kristy Joi Downing; Just Intellectuals

(57) ABSTRACT

The present disclosure relates to a computer-implemented method of verifying a recipient address in an electronic correspondence, the method including the steps of: receiving a recipient address in an electronic correspondence; running an addressee verification logic configured to verify the recipient address according to any one of an: address suffix comparison, correspondence content, recipient combination, or to-from combinations; and indicating whether the addressee information is verified.

3 Claims, 14 Drawing Sheets

EMAIL ADDRESSEE VERIFICATION SYSTEMS AND METHODS FOR THE SAME

CROSS-REFERENCE TO RELATED APPLICATIONS

This application is a continuation and claims the benefit of U.S. Patent Provisional Ser. No. 61/436,183 titled "Send Check" filed Jan. 25, 2011, which is hereby incorporated by reference in its entirety.

TECHNICAL FIELD

The present disclosure relates to data management and review systems for electronic correspondences.

BACKGROUND

As personal computers become more popular electronic correspondences also are increasing in use and popularity. Electronic mail (or email), text messages and instant messages are common modes of communication for both personal and professional use. Conventionally, correspondences as sensitive as those including medical information, payment history, account information, legal services, and even government correspondences are sent via email. It is just comparatively very convenient to send a correspondence electronically rather than through a hand-delivery system or courier. The delivery time literally shrinks from days to seconds. Thus, it is increasingly important to ensure that each correspondence sent electronically is properly addressed.

Especially with respect to electronic mail, it has become popular for user interface software to provide a user with assistance in drafting the correspondence. For example, some email software systems will provide users with the option of automatically completing in the remainder of an addressee's email address. The software saves all prior addressee information and regenerates a list of possible matches based on the first few characters of the addressee's information. So for a recipient named John Doe with an email address of johndoe@mailbox.com, the software may recognize the address based on the user entering "john" in the addressee line. The software will then generate a pop-up box which will list either "John Doe" or johndoe@mailbox.com as one of the possible selections or matches.

While this automatic filler is of convenience it can cause errors. For example, if a user has emailed several different users with the first name of John, a user could inadvertently select and send a correspondence to the wrong John, e.g., John Dakota, John Denver or John Downing. Also, many programs link the addressee filler program with the user's contact list. When a user types the first or last name of the addressee an email address is generated based on contact information stored by the program. This has utility where a person's email address does not necessarily directly match the spelling of their first and last names. For example, John Doe II might have an email address of jdoe@mailbox.com. If "John" is typed into the address line and John Doe II was added to the user's contact list, the email address of jdoe@mailbox.com will be generated as an optional addressee. If "John" is typed into the address line without John Doe II being added to the user's contact list, however, the email address of jdoe@mailbox.com will not be generated. Other email addresses like, e.g., johndoes@mailbox.com can however be listed as a potential selection and inadvertently added to the addressee line.

Existing email software programs have some checks to mitigate inadvertent sending. For example, some programs will check addressee information for format. So that if the address is written without an acceptable domain reference, e.g., @ something @com or @somewhere/org, the user will be prompted with an error message to indicate that the address is non-existent. Still, this correction software cannot manage emails that are appropriately formatted but simply addressed to the wrong addressee. Also, while many communication software programs include spell check, the data scanner for spell check typically foregoes checking the address lines since most email addresses would not pass ordinary spelling or grammatical standards.

Therefore, it is desirable to have a software program that verifies addressees in electronic correspondences to ensure that the intended recipients are listed before the correspondence is sent.

SUMMARY

The present disclosure addresses one or more of the above-mentioned issues. Other features and/or advantages may become apparent from the description which follows.

One exemplary embodiment relates to a computer-implemented method of verifying a recipient address in an electronic correspondence, the method includes: receiving the recipient address in the electronic correspondence; running an addressee verification logic configured to verify the recipient address based on the recipient address and a sender address of the electronic correspondence; assessing how many characters are shared between an address suffix of the sender address and an address suffix of the recipient address; and sending a signal if the address suffix of the sender address and the address suffix of the recipient address have less than a predetermined number of shared characters.

Another exemplary embodiment relates to a system for verifying a recipient address in an electronic correspondence, including: a storage device having addressee verification logic configured to verify a recipient address, the addressee verification logic includes: suffix review logic configured to review address suffixes of the recipient address and a sender address of the electronic correspondence. Suffix review logic is further configured to assess how many characters are shared between the address suffix of the sender address and the address suffix of the recipient address. The addressee verification logic is configured to send a signal if the address suffix of the sender address and the address suffix of the recipient address have less than a predetermined number of shared characters.

One of the advantages of the present disclosure is that it teaches computer-executed algorithms that reduce the probability of inadvertently sending electronic correspondences to an incorrect email address. The privacy of the correspondence is thereby better secured. The teachings also require less user input or review of electronic correspondences to confirm that the appropriate email address has been entered.

The invention will be explained in greater detail below by way of example with reference to the figures, in which the same reference numbers are used in the figures for identical or essentially identical elements. The above features and advantages and other features and advantages of the present invention are readily apparent from the following detailed description for carrying out the invention when taken in connection with the accompanying drawings. In the figures:

DETAILED DESCRIPTION

Figure 1:
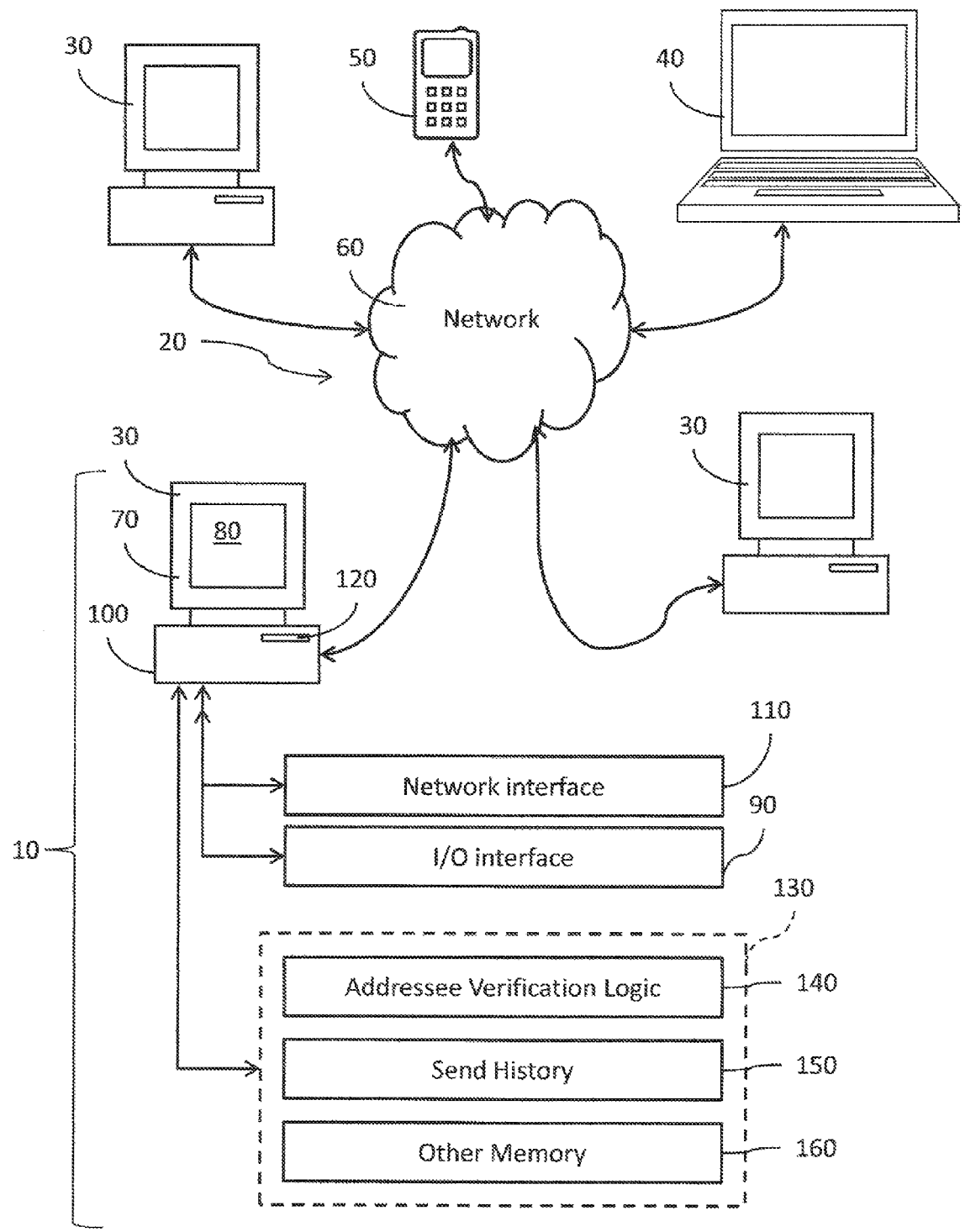
FIG. 1 is a schematic illustration of a network with at least one computer configured with exemplary addressee verification logic.

Referring to the drawings, wherein like characters represent the same or corresponding parts throughout the several views there is shown a system for verifying the addressee information in an electronic correspondence. The addressee verification system includes logic to review addresses entered into the correspondence's recipient line. The system is configured to run different reviews and comparisons related to addressee information. In doing so, the system highlights odd email addresses that have a higher probability of being addressed to an inadvertent recipient. For example, one conditional addressee verification program examines the frequency with which a user has sent each recipient an electronic correspondence over a predetermined period of time. If the lag in correspondence exceeds a predetermined threshold the user is asked for verification of the address to confirm that the correspondence was intended to be sent to the designated recipient. Other embodiments include, for example, system checks according to odd-ball email suffixes and correspondence content triggers. The use of this system increases the security and integrity of electronic correspondences. Users are less likely to inadvertently send an electronic correspondence to the wrong addressee. The system also enables the user to control the level of review for address notification logic from high to low or completely off. In doing so, a user can tailor the program's review level intensity as desired.

As shown in FIG. 1, there is a system 10 for verifying a recipient address in an electronic correspondence. The system 10 is linked to a network 20 of computers. The network can be a local area network or wide area network. As shown, different types of computers are linked to the network 20 including personal computers 30, laptops 40 and mobile devices 50. Other computers can be linked to the network 20 as well including, e.g., data processing systems, personal data assistants, cellular phones, and electronic tablets. Computers 30, 40, 50 are linked to the network 20 through communication lines that can be hardwired or wireless. The network 20 has at least one server 60 through which information is stored and transferred. Any one of the computers can be configured with a version of addressee verification logic. In other embodiments, multiple computers share an internal server that communicates with a global server. In this embodiment, the local server 60 is configured to store a different version of addressee verification logic as well.

In the illustrated embodiment of FIG. 1, the system 10 for verifying a recipient address in an electronic correspondence includes a personal computer 30 or desktop computer. Computer 30 includes a monitor 70 with user display 80 for communicating information to a system user. The monitor 70 is linked to an input/output interface 90 for receiving user information and displaying or communicating information to a user. The input/output interface 90 can also be linked to other input devices including a keyboard, mouse, audio system or video camera. The display 80 can be any sort of screen or display including e.g., an LCD, CRT, heads-up display or screen. The display 80 is linked to a hard drive 100. Hard drive 100 is linked to a network interface 110 that enables communication between the computer 30 and network 20. Network interface 110 can be a modem, for example. Wireless cards and communication devices can also be in communication with the hard drive 100. Hard drive 100 also includes a drive 120 for reading portable medium, e.g., a CD or floppy drive. Other drives can be used with the computer 30 such as USB, DVD, XD, MMC SD, DUO, CF, any hard disk drive, optical storage drive, or magnetic storage drive.

As shown in FIG. 1, the computer 30 is linked to a storage device or memory 130. The memory 130 can be internal or external to the computer 30. The memory 130 consists of both ROM and RAM. Included in the computer memory 130 is addressee verification logic 140 that, in this embodiment, is configured to perform a series of checks on an electronic correspondence to verify whether the electronic correspondence is properly addressed or addressed to the intended recipient(s). Addressee verification logic 140 is installed on the computer by a computer program. Exemplary addressee verification logic is discussed hereinbelow.

Also included in the computer's memory is a send history 150 for electronic correspondences previously sent from a user's email account. Historical information can be stored on the computer hard drive or remotely stored and accessed as-needed. The send history 150 includes the addressees of prior sent correspondences, the content of previously sent correspondences, the time and date of the correspondences, receipt confirmations and other information. Send history 150 includes readable and writable medium. The memory 130 further includes other memory 160 or RAM/ROM. This memory 130 can be used to facilitate the computer operating system, store other information such as contact lists, calendars, files, and back-up information.

Figure 2:
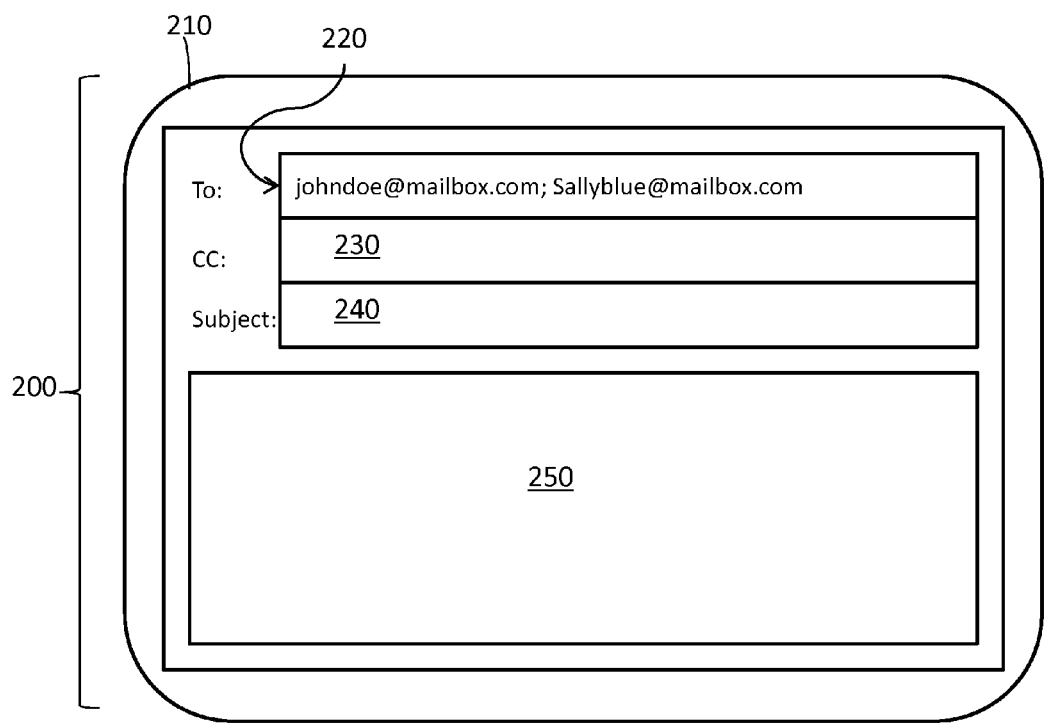
FIG. 2 is an exemplary user interface screen for drafting an electronic correspondence.

Referring now to FIG. 2, there is shown therein a partial view of a display 200 or computer screen on a computer compatible with exemplary addressee verification logic. The display 200 is in communication with an exemplary system for verifying a recipient address in an electronic correspondence. There is showing a user interface screen 210 used for receiving information for an electronic correspondence. In this embodiment, the correspondence is an email. The correspondence can be any sort of electronic communication, however, including a text message or instant message. Through the user interface screen 210 a user is prompted to enter addressee information and content which is delivered to designated recipients. The interface includes a recipient's line 220 where email addresses can be entered and separated by a comma or semicolon (as shown). The interface also includes a carbon copy (or CC) line 230 for adding additional recipients and a subject line 240 for information related to the substance or content of the email. The content or body of the email can be entered in a content field 250. Once the email is drafted the user can issue a delivery command to the system to transmit the correspondence. For example, a send button or graphical interface can be selected through a mouse click. Upon receipt of the send command the system reviews the email address information for verification.

Figure 3:
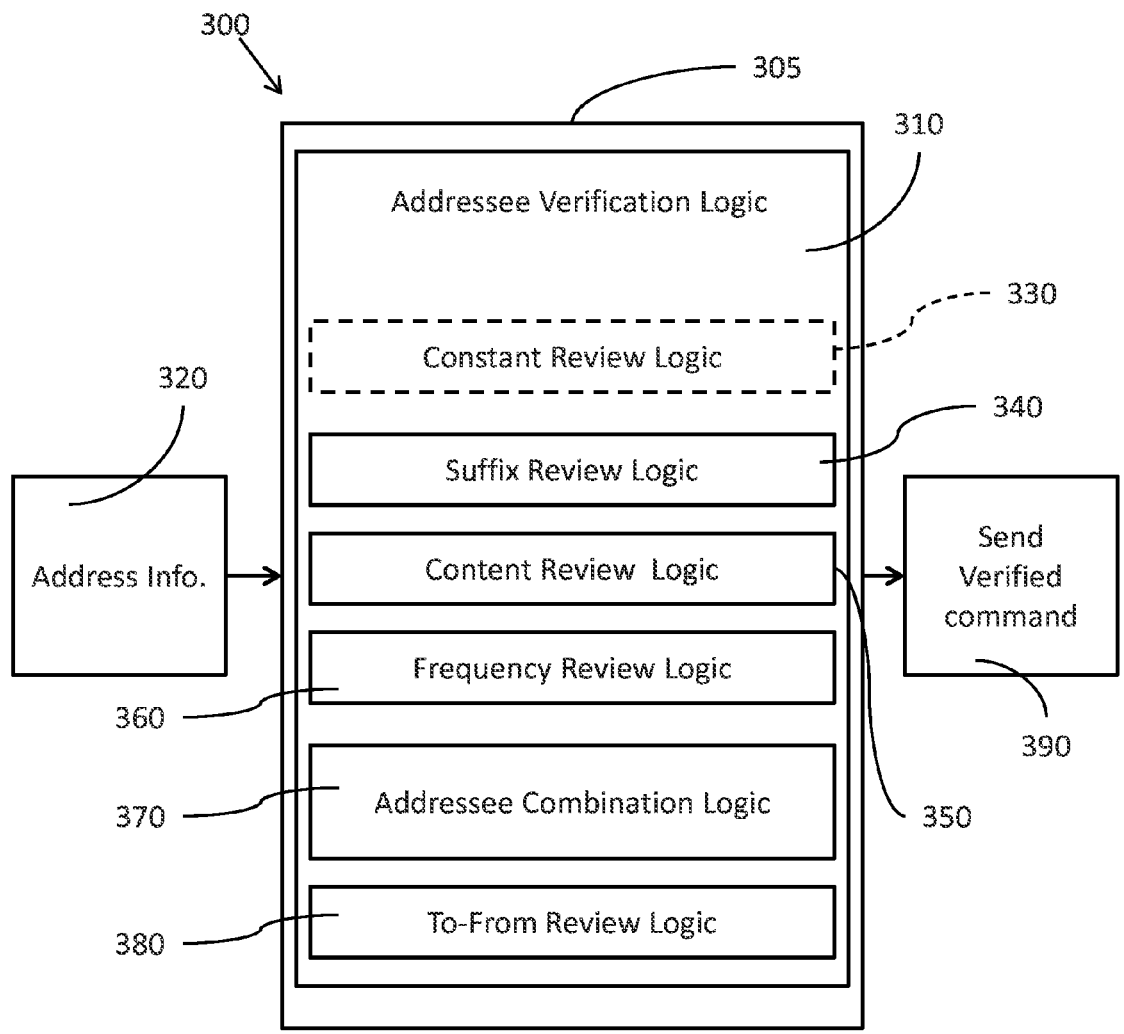
FIG. 3 is a schematic depiction of an exemplary control circuit for executing addressee verification logic.

Now with reference to FIG. 3, there is shown therein a schematic depiction of a control circuit 300 for a system for verifying addressee information. The control circuit 300 includes a processor 305 having addressee verification logic 310. Logic is configured to receive address and content information 320 related to each correspondence drafted for a user account. The information can include email addresses for the sender or user, to-recipient, cc-recipient and bcc-recipient as well as any content within the electronic correspondence. Addressee verification logic includes a set of subprograms that can be selectively executed to review the correspondence and notify users when a potentially inadvertent addressee is discovered. In the illustrated embodiment of FIG. 3, the processor 310 includes constant review logic 330, suffix review logic 340, content review logic 350, frequency review logic 360, addressee combination review logic 370 and to-from combination review logic 380. Addressee verification logic 310 can include any one or any combination of the illustrated logics, including fewer or more derivations than shown. Once the addressee verification logic 310 is satisfied, the logic sends a verification command 390 to the email account controller to deliver the correspondence. In this embodiment, when the addressee verification logic 310 is active it is configured to impede the transmission of an email until the recipient address information is verified.

Figure 8:
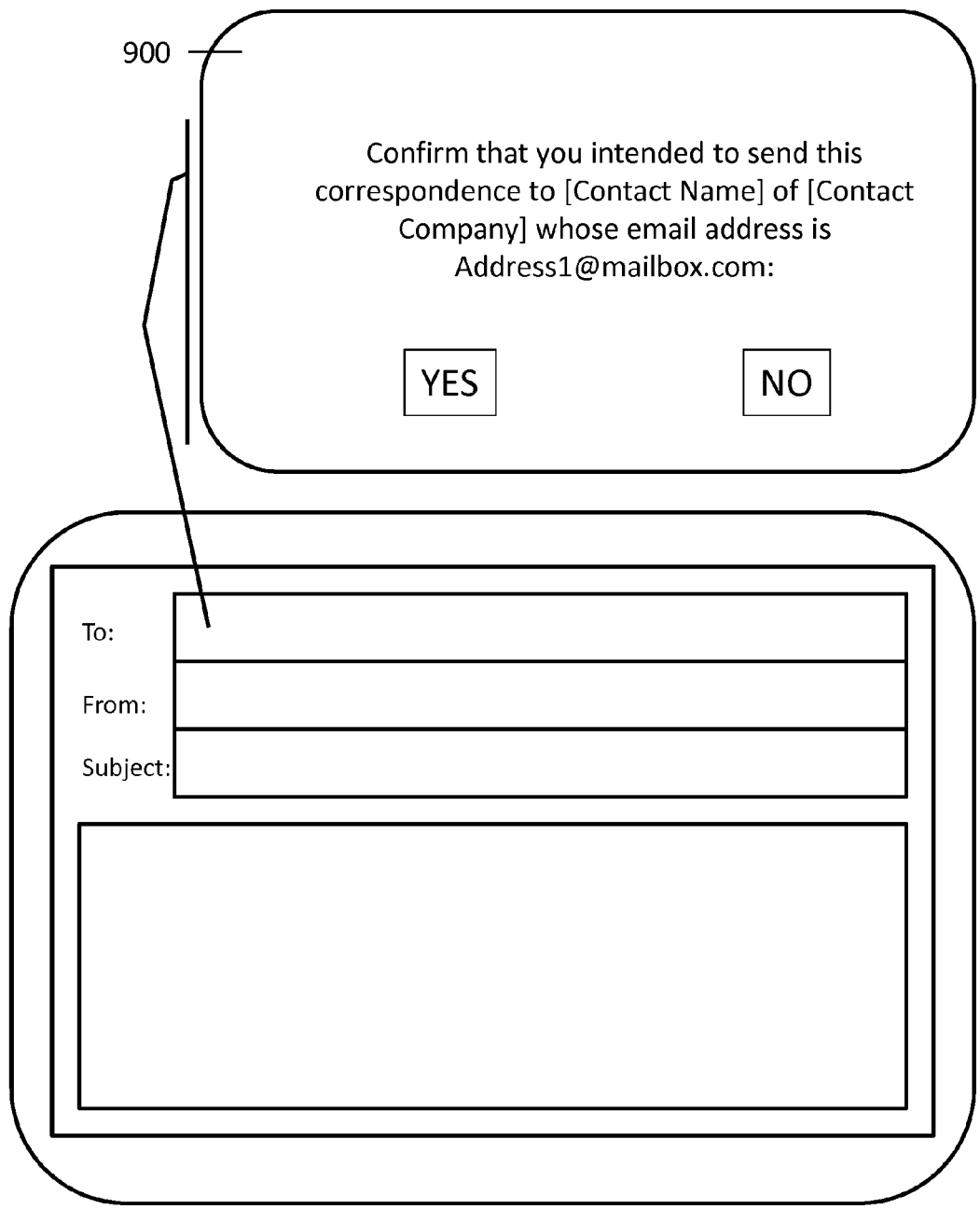
FIG. 8 is an exemplary user interface screen for verifying addressee information.

Addressee verification logic 310, as shown in FIG. 3, includes a constant review logic 330 that can be optionally activated. In this embodiment, the constant review logic 330 is off but can be actuated with a command signal. Constant review logic 330 prompts a user with a different interface screen to review the email address information sent to each recipient individually. For example, as shown in FIG. 8, after the send command is sent, constant review logic pulls every recipient listed and provides the email address information on a pop-up screen 900. In this embodiment, constant review logic 330 is configured to receive contact information stored in the user account. Logic 330 cross-references the stored contact information for a matching email address. When logic 330 finds a match, logic pulls designated contact information from the contact list and includes that information in the verification prompt or screen. The verification prompt 900, as shown in FIG. 8, also includes the contact's name and the contact's company information to highlight more information about the recipient than just the email address for the user's review. A user can then use the keyboard and/or mouse to select yes/no in verifying the recipient's email address. It can also be the case that the contact has more than one listed email address. In another embodiment, constant review logic 330 is configured to also pull any remaining email addresses obtained from the user's contact list and ask the user which email address is preferable for this correspondence.

Constant review logic 330 is configured to execute a method of verifying a recipient address in an electronic correspondence. The method includes the steps of obtaining address information as listed in the correspondence draft; cross-referencing the address information with a preexisting user contact list; providing contact information related to the address information; and prompting a user for a verification command confirming the address information. In another embodiment, constant review logic does not cross-reference an existing user contact list but merely re-presents the email address in a highlighted fashion (e.g., larger or different color font) to facilitate a second review. Constant review logic can be executed by any computer software program or operating system.

Figure 4:
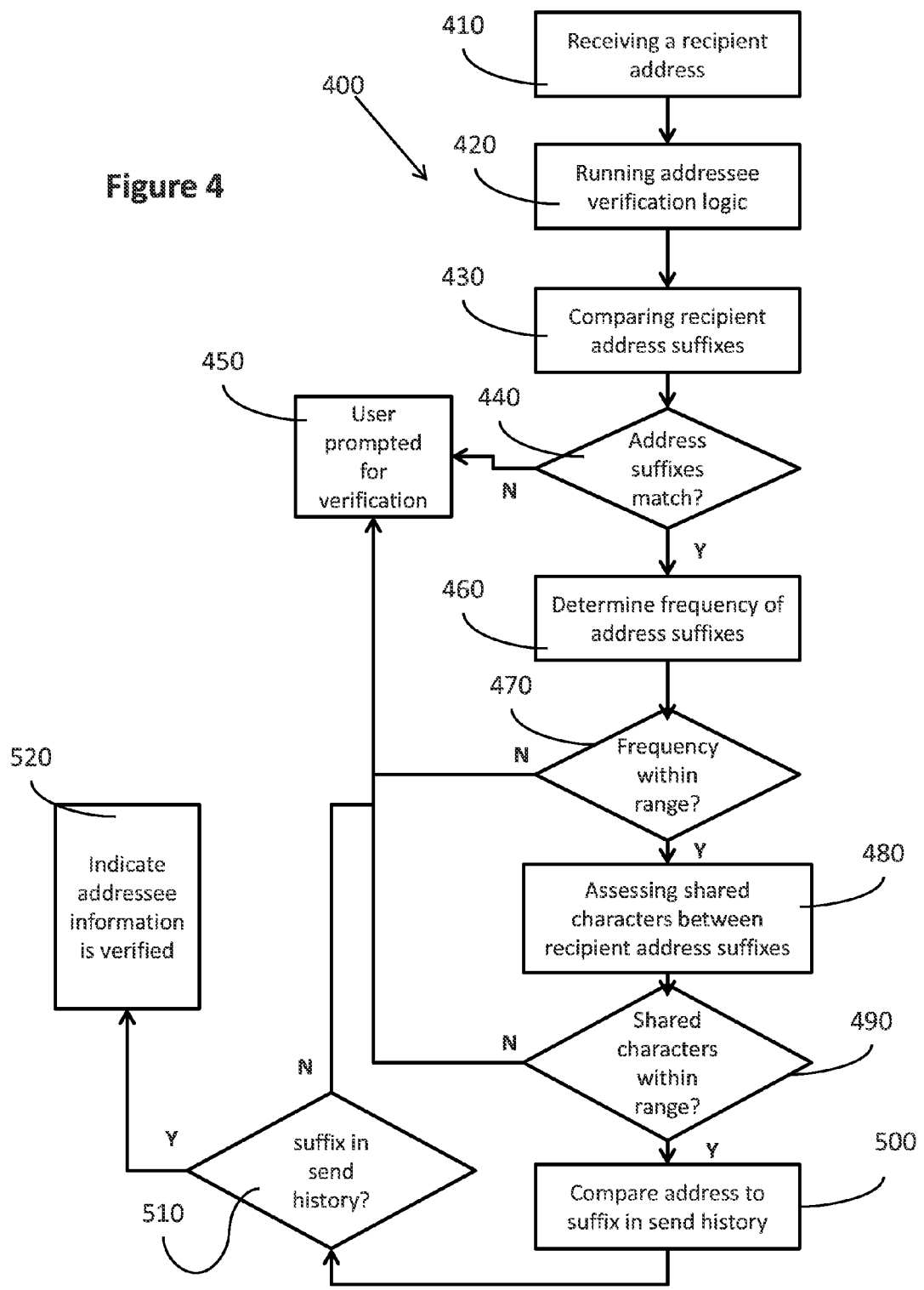
FIG. 4 is a flowchart of an algorithm for verifying a recipient address in an electronic correspondence.
Figure 9:
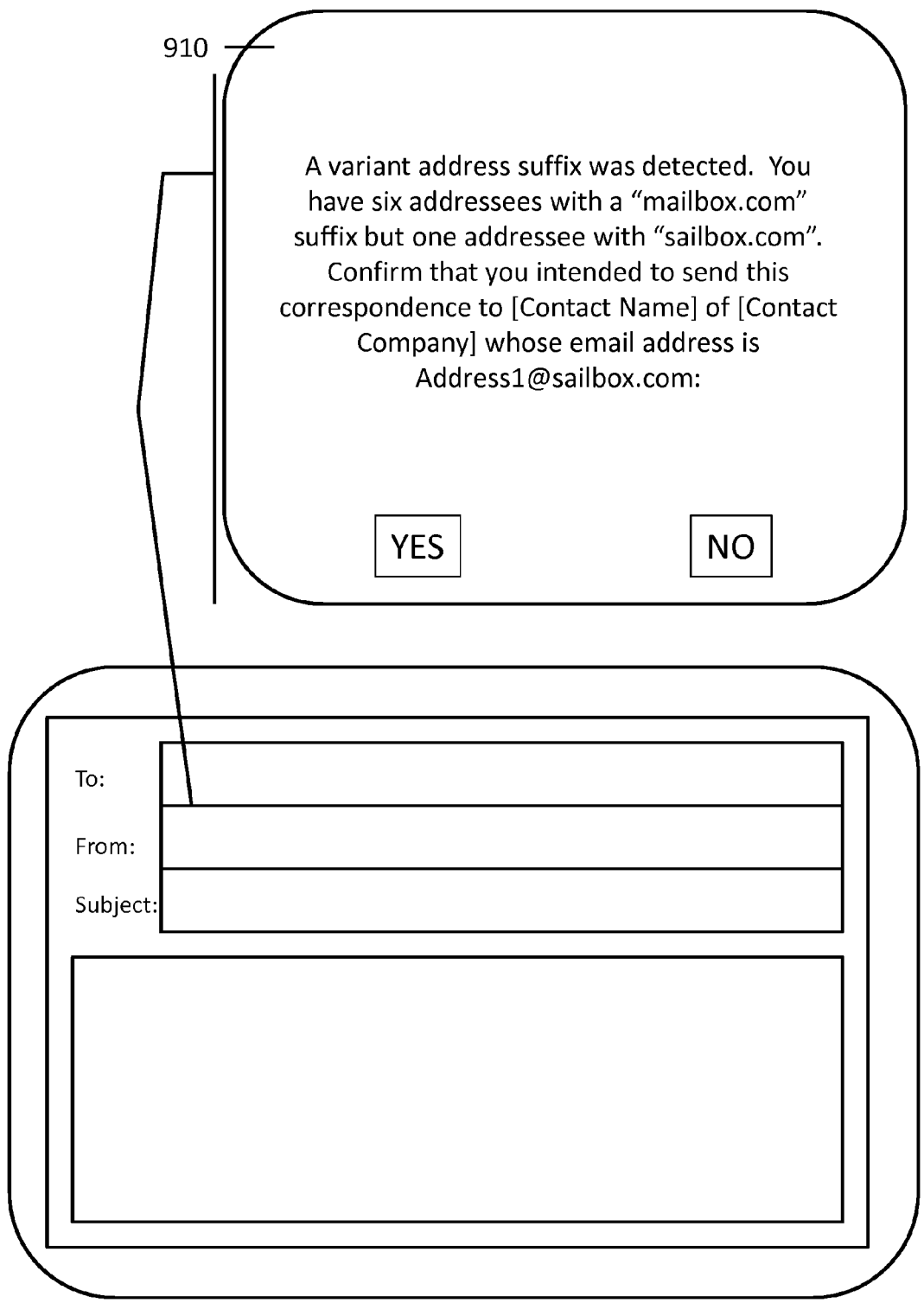
FIG. 9 is an exemplary user interface screen for verifying addressee information.

Addressee verification logic 310, as shown in FIG. 3, also includes suffix review logic 340. Suffix review logic 340 is configured to analyze the email address suffixes and prompt a user for verification only when a predetermined condition is met. With respect to email addresses, the suffixes are defined as the characters that come after the "@" or at character. For example, where a user has entered more than one email address, the address suffixes to each address are compared. If a non-matching suffix is detected, the logic 340 issues a user verification prompt 910, e.g., as shown in FIG. 9. An exemplary algorithm of suffix review logic 340 is also shown in FIG. 4. As shown in FIG. 3, the suffix review logic 340 detected at least two email suffixes used in the recipient line: "mailbox.com" and "sailbox.com." The suffix review logic, as shown in FIG. 3, is configured to assess which suffix occurs less often in the email correspondence and highlight that suffix for verification. In another embodiment, the suffix review logic compares email suffixes that have a substantial number of similar characters in similar order. The example, "mailbox.com" and "sailbox.com" can exemplify this feature as well since the two suffixes share ten characters in the same order. A system target for triggering verification based on similarity of address suffixes could be five or more common characters. In that instance, a correspondence with suffixes such as "redsox.com", "whitesox.com" and "mailbox.com" would trigger a signal to impede the transmission of the email and request addressee verification from the user. Once the user verifies that the addressee is the correct addressee, verification logic sends a send verification command to the email control logic and the email is delivered.

Suffix review logic 340 is configured to execute a method of verifying a recipient address in an electronic correspondence. The method includes the steps of obtaining the suffixes of each addressee in an email correspondence; identifying if the number of addressees is greater than one; when the number of addressees is greater than one, comparing the suffixes to a first suffix; when any suffix is different than the first suffix prompting a user for a verification command confirming the address information. With the execution of this computer-implemented method, odd-ball email addresses in a string of recipients will be identified. In another embodiment, the method includes the steps of obtaining the suffixes of each addressee in an email correspondence; identifying if the number of addresses is greater than one; when the number of addressees is greater than one, comparing the suffixes to a first suffix; when any suffix has five characters or more similar to the first suffix, prompting a user for a verification command confirming the address information. In another embodiment, the percentage of common characters between recipient-address suffixes is derived by taking the total number of characters in one suffix and dividing the sum of common suffixes between two addresses by the total number in the original suffix. Accordingly between "sailbox.com" and "mailbox.com" 10 of 11 characters (or approximately 91%) are in common between the suffixes. In this embodiment, when the number of common characters between email suffixes exceeds a predetermined range (e.g., between 80% and 99%) the user is prompted for subsequent verification of the recipient email address. With the execution of this computer-implemented method, mistakenly entered email addresses in a string of recipients will be more readily identified. Suffix review logic 340 can be executed by any computer software program.

Addressee verification logic 310, as shown in FIG. 3, also includes content review logic 350. This program is configured to prompt a user for verification of addresses based on the substantive content of the correspondence or content in the body of the correspondence. A user is prompted to prescreen or identify certain email suffixes that are enabled to receive correspondences having designated content. For example, for a medical professional who heavily communicates with the Food and Drug Administration, those emails relating to FDA communications may always include a case reference number. As such, before any emails are sent, the user can designate that any correspondence having the content of "case reference number" or "Case Ref. No." be reviewed by content review logic 350. The user can designate that only email addresses with the suffix "fda.gov" (or "myfirm.com") are allowed to receive messages from the user account when the correspondence has the designated content. The user can also elect to have individuals with suffixes common to the user's email address enabled to receive said messages from user as well. In this way the assistant or staff of the same company as the user can receive messages from user without prompting the user for address verification. However, if the user happens to know a Fred Douglass from the FDA (whose email address is fredd@fda.gov) and a Fred Dunkin from their golf league (whose email address is fredd@golflovers.com) the system will identify the un-cleared suffix of "golflovers.com" based upon the case number reference in the body of the email and prompt the address information for user review.

Figure 10:
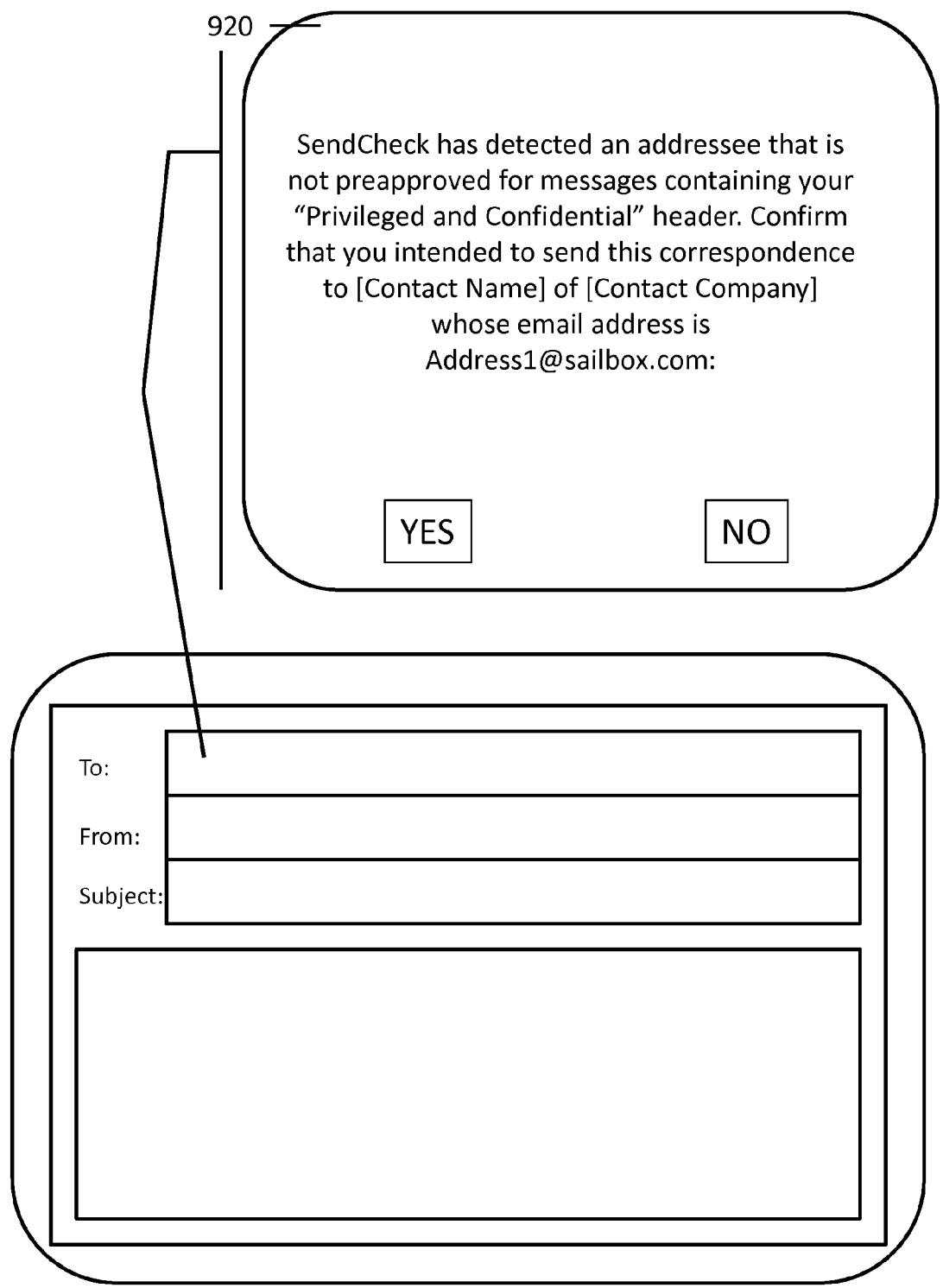
FIG. 10 is an exemplary user interface screen for verifying addressee information.

Another example is provided with legal professionals that send client information using a "Privileged and Confidential" header or footer in the body of the email. A list of client suffixes can be manually or automatically entered and stored by content review logic 350, as shown in FIG. 3. Where the "Privileged" or "Confidential" content, for example, is included in an email addressed to an unapproved email suffix, the user receives a prompt for a secondary review or verification, e.g., 920 as shown in FIG. 10. Once the user verifies the address, a send verification command 390, as shown in FIG. 3, is sent to the email control logic. Where the content is already in-line with an approved email suffix, no verification prompt is generated. In another embodiment, content review logic is configured to review the content of any attachments having editable text therein. For example, an attachment in a word processing format or electronic presentation having any content flags will also result in content review logic prompting a user for verification. In other embodiments, content triggers or flags include a wide variety of text, e.g., closing remarks such as "confidential," "privileged," "love you," "account no.," "patent", "copyright," "trademark," or "v." Logic can be used to ensure that sensitive information is not passed to the wrong party be it professional information to a personal acquaintance or personal information to a professional acquaintance or unintended recipients on either end of the spectrum, e.g., client 1 correspondences being sent to client 2.

Figure 5:
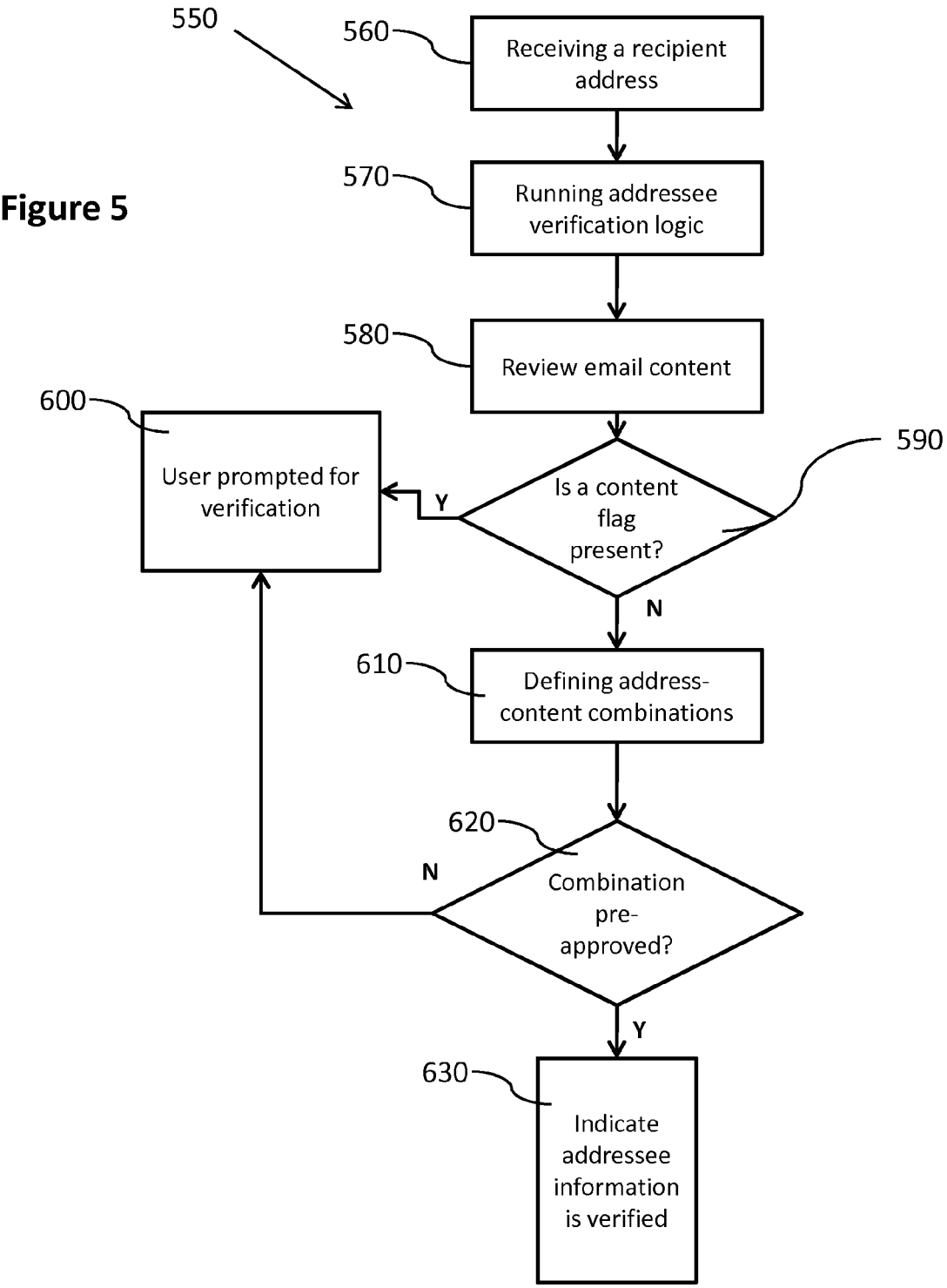
FIG. 5 is a flowchart of an algorithm for verifying a recipient address in an electronic correspondence.

Content review logic 350 is configured to execute a method of verifying a recipient's address in an electronic correspondence. The method includes the steps of: accepting at least one content trigger; reviewing the content of an email for any predetermined triggers; where a predetermined trigger is detecting flagged content with the suffixes of each addressee in an email correspondence; comparing the suffixes to the predetermined trigger; and when any suffix is not preapproved for the trigger, prompting a user for a verification command confirming the address information. This embodiment of content review logic can be executed by any computer software program. Another exemplary algorithm of content review logic is also shown in FIG. 5.

Figure 11:
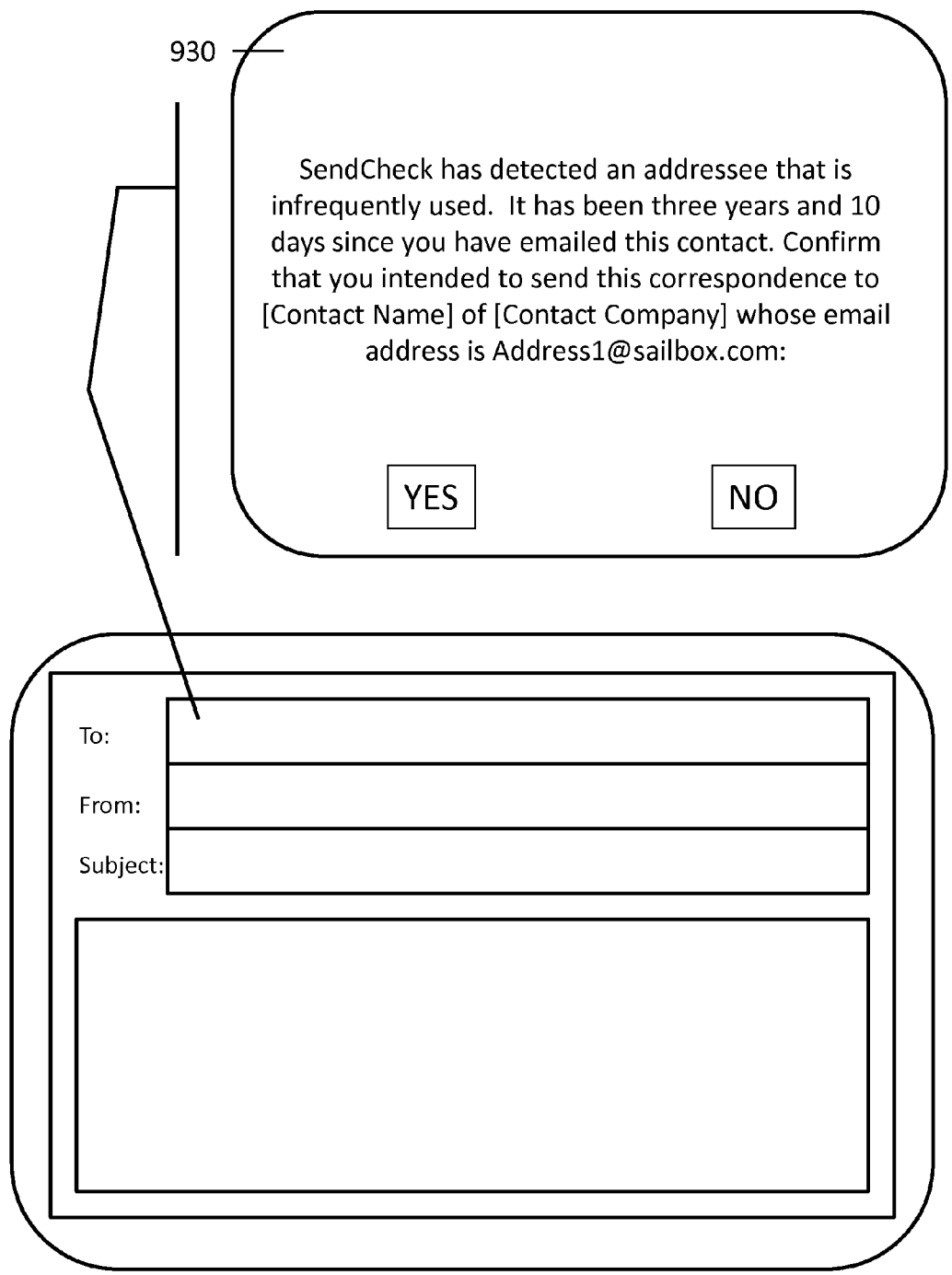
FIG. 11 is an exemplary user interface screen for verifying addressee information.

Addressee verification logic 310, as shown in FIG. 3, also includes frequency review logic 360. Frequency review logic 360 is configured to determine how frequently a user has emailed a certain recipient and based on said frequency selectively prompt the user for verification of intent to send the correspondence to the designated recipient. One exemplary threshold for frequency is, for example, 18 months. If the user has not emailed this contact or addressee for more than 18 months a user verification prompt is generated (e.g., 930 as shown in FIG. 11). Frequency review logic 360, as illustrated in FIG. 3, is in communication with the send history (e.g., 150 as shown in FIG. 1) and archived messages for the email account. In another embodiment, frequency review logic 360 is configured to assess how frequently the user has received an email from this account. If the user has not emailed the contact over the predetermined period but has received an email from the contact within that period the user verification prompt is forgone and the email is delivered. Frequency review logic 360 can contain its own RAM to store send history or access the email control logic to obtain send history on an as-needed basis. Once the user verifies that the email recipient information is correct, a send verification command is generated by the logic.

Frequency review logic 360 is configured to execute a method of verifying a recipient address in an electronic correspondence. The method includes the steps of: accepting email addressee information; comparing addressee information with send history over a predetermined time period; where the addressee information is not found in the designated send history, prompting a user for a verification command confirming the address information. Frequency review logic can be executed by any computer software program.

Figure 12:
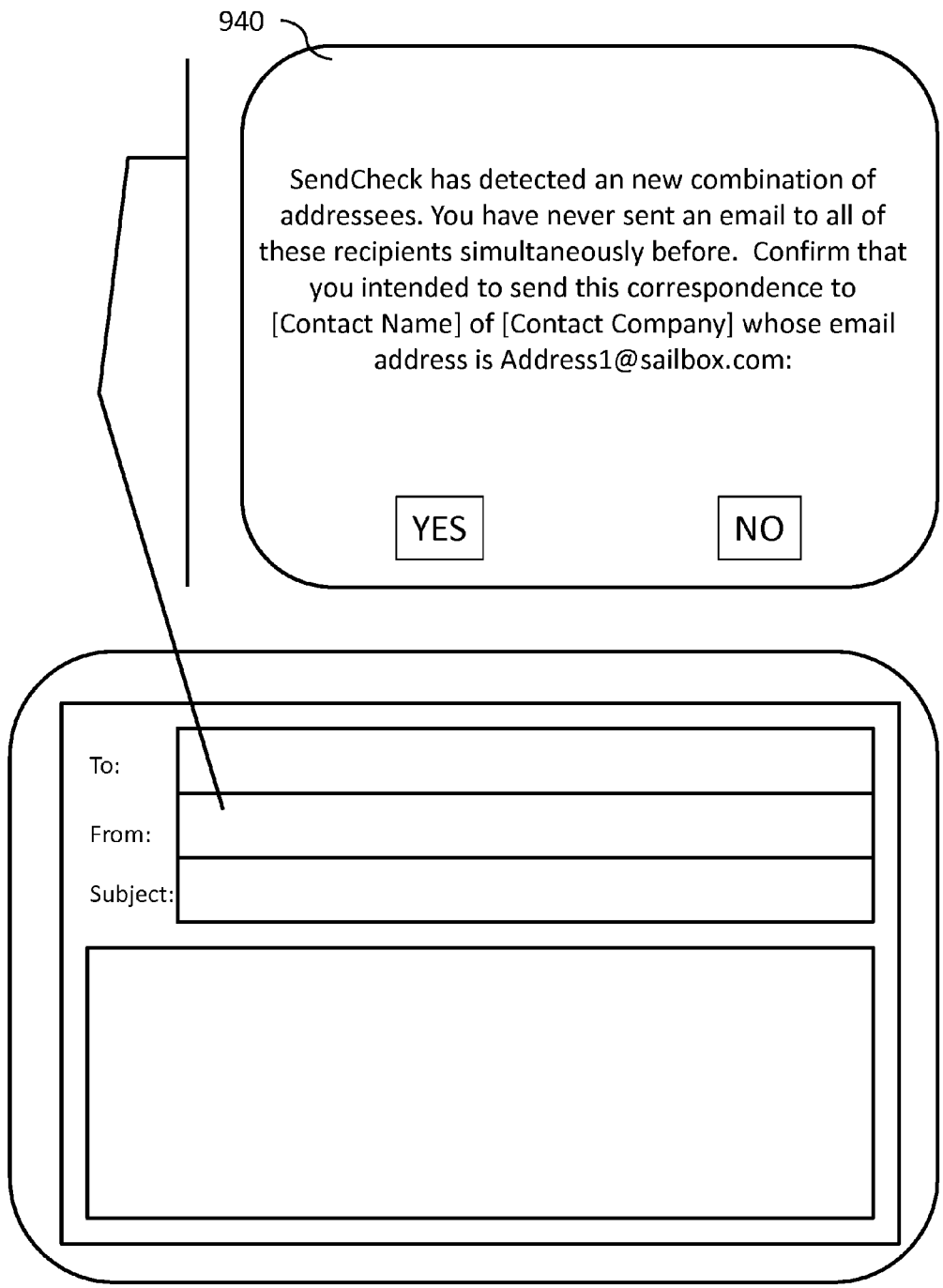
FIG. 12 is an exemplary user interface screen for verifying addressee information.

Addressee verification logic 310, as shown in FIG. 3, also includes addressee combination logic 370. This logic is configured to compare recipient addresses on the same email and prompt the user where a new combination of addresses exists. For example, in a continuing project it is commonplace to include the same project team members on correspondences related to project progress. Mis-entering one of the names in the string of recipients can upset the security of the correspondence. In this embodiment, logic is configured to review the send history for emails to the project group and where a new addressee is included in the group or in combination with other group members a user verification prompt is generated (e.g., 940 as shown in FIG. 12). Once the user verifies that the email recipient's information is correct, a send verification command is generated by the logic.

Addressee combination review logic 370 is configured to execute an exemplary method of verifying a recipient address in an electronic correspondence. The method includes the steps of: accepting email addressee information; determining whether more than one addressee is provided; where more than one email addressee is provided defining a test group of all addressees; comparing the test group with any other groups in the send history over a predetermined time period; where the test group is not found in the designated send history, prompting a user for a verification command confirming the address information. In another embodiment, the logic compares the test group with any other groups in the receipt history of the user over a predetermined time period. Addressee combination review logic can be executed by any computer software program.

Figure 6:
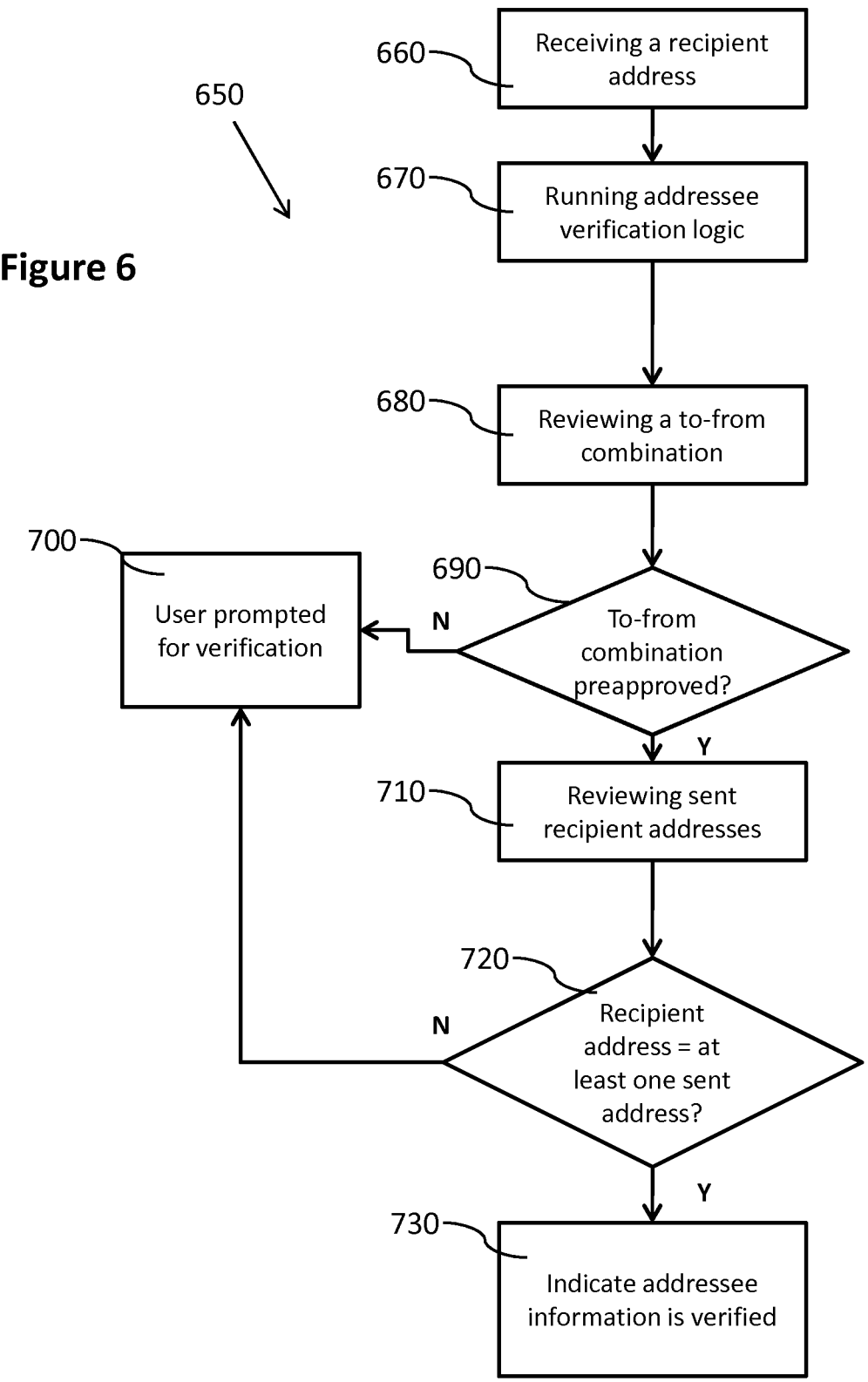
FIG. 6 is a flowchart of another algorithm for verifying a recipient address in an electronic correspondence.
Figure 13:
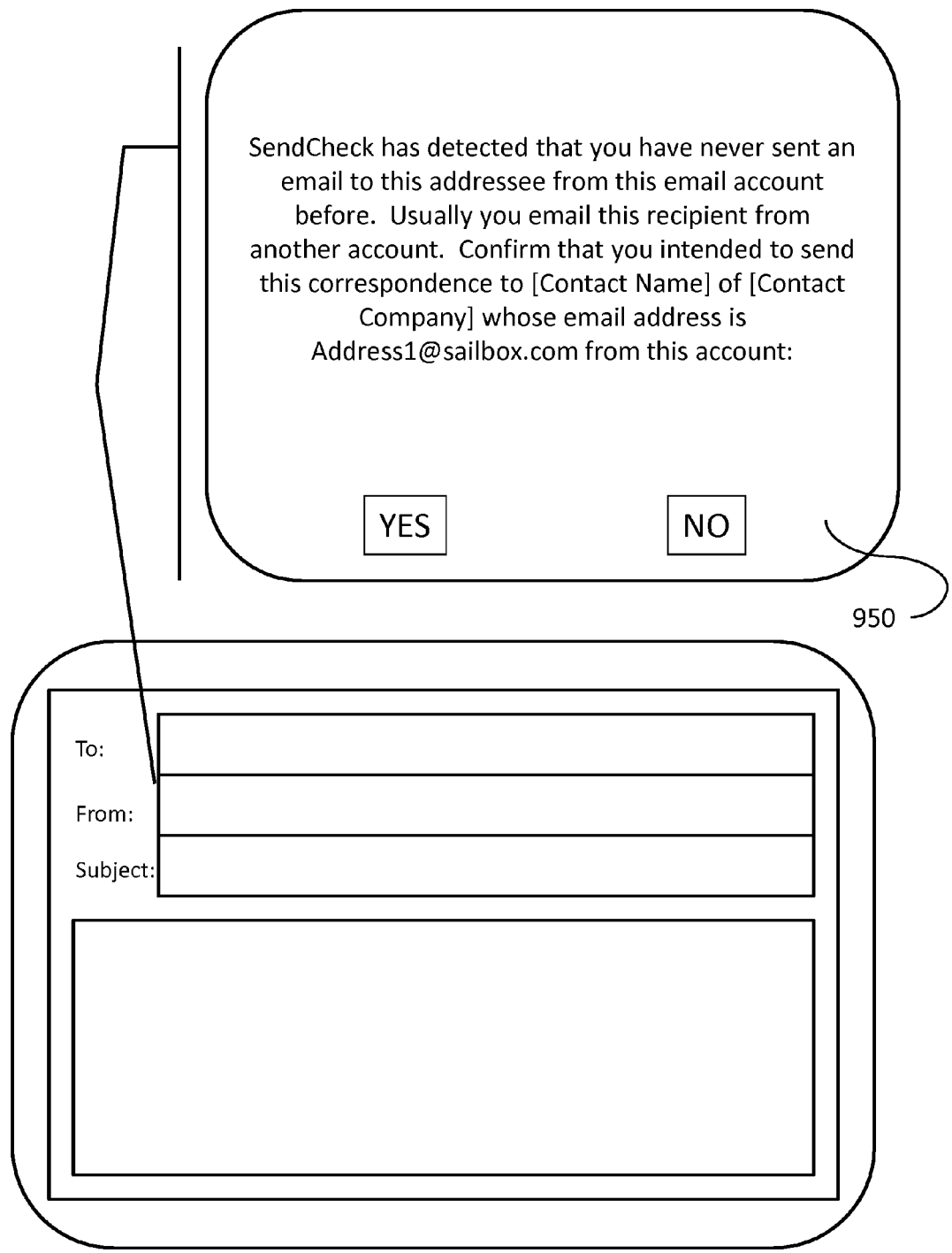
FIG. 13 is an exemplary user interface screen for verifying addressee information.

Addressee verification logic 310, as shown in FIG. 3, also includes to-from review logic 380. To-from review logic 380 is configured to compare the send history for each user account to the addressee information entered. For example, many email programs enable a user to send emails from multiple accounts using the same interface and contact list. Where a new addressee or contact is emailed with respect to one account a user verification prompt is generated (e.g., 950 as shown in FIG. 13). An exemplary algorithm of to-from review logic 380 is also shown in FIG. 6. In this way, email accounts that share contacts can remain separate. In another embodiment, the receipt history for the email account is also reviewed to determine if the user has received an email from the addressee on the sending email account. Once the user verifies that the email recipient's information is correct, a send verification command is generated by the logic.

To-from review logic 380, as shown in FIG. 3, is configured to execute a method of verifying a recipient address in an electronic correspondence. The method includes the steps of: accepting email addressee information; accepting sender account information; comparing the addressee information with the send history of the sender account over a predetermined time period; where the addressee information is not found in the designated send history, prompting a user for a verification command confirming the address information. In another embodiment, the logic 380 compares the addressee information with the receipt history of the sender account over a predetermined time period. To-from review logic 380 can be executed by any computer software program.

With reference now to FIG. 4, there is shown an exemplary algorithm 400 for addressee verification logic. The method or algorithm 400 is focused on verifying addressee information based on the suffixes of recipient addresses. The algorithm thereby constitutes one exemplary computer-implemented method of verifying a recipient address in an electronic correspondence. The method 400 starts by receiving a recipient address in an electronic correspondence at 410. Once the address is received the method continues to the next step of running addressee verification logic 420 configured to verify the recipient address according to address suffix comparisons. In other embodiments, the system must first receive a send command from a user before the addressee verification logic is activated. The method next involves making comparisons between the suffixes of various recipient email addresses in the electronic correspondences at 430. For example, at step 440 the method decides whether all of the recipients share the same email address suffix. For example, where a correspondence is meant to remain internal to a company all recipient address suffixes should be shared (e.g., John@company1.com, sara@company1.com and jim@company1.com all share the same suffix thereby the system verifies that the email is only being sent internally within the company). If it is determined that any suffix is an outlier or not matching than the addressee is not verified by the system and the user is prompted for self verification at 450. A verification prompt in one embodiment alerts the user that not all suffixes match and asks the user if this is intended. The user may then respond by selecting yes or no. In this case one verifier is: all of the suffixes matching in the email or having received a user override of the same. If all suffixes match or the user provides an override, the system moves on to step 460 and determines the frequency of address suffixes. For example, if not all suffixes were intended to match but some suffixes occur with greater frequency than others the user can be prompted to verify the email address. After the rate of frequency for each email address suffix in the correspondence is determined at step 460 the algorithm decides whether each suffix frequency is within a predetermined range at 470. In some embodiments, the predetermined range of frequency is an occurrence at least twice throughout the correspondence; in other embodiments, the frequency range is as high as 50% (as compared to the total number of suffixes). If the suffix occurs outside of the intended frequency range the user is promoted to override the system and provide a verifier for the program to continue or to send the correspondence as-is. By prompting the user for an override the system indicates whether the addressee information is verified. In other embodiments, the indication can take the form of a warning signal, audio or visual alarm, or a different user prompt.

As shown in FIG. 4, the method also includes verification of the recipient-address suffixes by assessing the shared characters between a recipient-address suffix and other suffixes in the correspondence at step 480. In this embodiment, a predetermined range of shared characters is required for the correspondence to obtain a verification signal. If the shared characters are within a range the system continues to step 490. If the shared characters are outside of the predetermined range the system continues to step 450 and requests verification or override from the system user. An exemplary range for shared characters can be as great as 100% or substantially lower. This can be another way of determining whether the suffixes match in a correspondence—i.e., if each suffix has 100% shared characters.

Next the algorithm executes step 500, comparing the address suffix to the historical suffixes stored in the system send history. If the suffix is within the send history at step 510 the email is verified by the system. The system sends an indication of the addressee information being verified at 520. The indication could be transmitting the correspondence, for example, or an alpha-numeric message displayed on a user screen. The algorithm 400 sends a signal to the i/o interface to display the message. If the suffix is foreign or novel to the system, the user will be prompted for a second review at 450. If the suffix is verified by the user the correspondence will no longer be impeded but allowed to transmit.

Referring now to FIG. 5, there is shown an exemplary algorithm 550 for addressee verification logic. The method is focused on verifying addressee information based on the content of the email as compared to recipient addresses. The algorithm 550 thereby constitutes another exemplary computer-implemented method of verifying a recipient address in an electronic correspondence. The method 550 starts by receiving a recipient address in an electronic correspondence at 560. Once the address is received the method continues to the next step of running addressee verification logic 570 configured to verify the recipient address according to address suffix comparisons. The method 550 next involves a review of email content for a content flag or trigger 580. Exemplary content flags are described herein above with respect to FIG. 3. The system determines if a content flag is present at 590. If a content flag is detected the system prompts the user for an override or self-verification that the content is intended for the designated recipient address at step 600. If the correspondence does not include a content flag the system moves to the next step—defining an address-content combination at 610. An address-content combination is established based on the content of the correspondence and the recipient address. All or a portion of the email content can be used to establish the combination. For example, the logic can identify noun and addressee combinations, content flags and addressee combinations or other combinations. Addressee verification logic stores or accesses pre-approved combinations. At step 620, the logic determines if the addressee combination is a pre-approved combination. If the combination is pre-approved the system indicates that the addressee information is verified at 630. If the system previously impeded transmission of the email, the email is enabled to transmit thereafter. If the combination is not preapproved a user is prompted for review of the email address at 600. An exemplary user prompt is as follows: "Send Check noticed that you have not approved privileged content to be sent to Michael@gmail.com, do you intend to send this email to the indicated addressee?" If the user confirms that the address is correct, addressee verification logic is overridden and the email is transmitted.

Now with reference to FIG. 6, there is shown an exemplary algorithm 650 for addressee verification logic. The method 650 is focused on verifying addressee information based on the to-from combinations in the email correspondence as compared to pre-approved combinations or past combinations. The algorithm 650 thereby constitutes another exemplary computer-implemented method of verifying a recipient address in an electronic correspondence. The method 650 starts by receiving a recipient address in an electronic correspondence at 660. Addressee verification logic runs at step 670. The program reviews the to-from combinations of the correspondence at 680. Particularly, if the user has several email accounts, logic can be used to verify that the selected user account is used to address the intended addressee. Pre-approved to-from combinations are stored by the logic. If the to-from combination is pre-approved at step 690 the program continues. In another embodiment, the correspondence is sent after verification from the pre-approved list. If the to-from combination is not verified the user is prompted for secondary review or verification of the combination at step 700. At step 710 the program reviews the sent recipient addresses. At step 720 the system checks to determine if the email address is in the historical sent addresses for the user account. If the recipient address is not in the send history the program prompts the user for verification of intent to send the correspondence to the recipient address at 700. If the recipient address is within the send history the program continues to step 730 indicating that the addressee information is verified.

Figure 7:
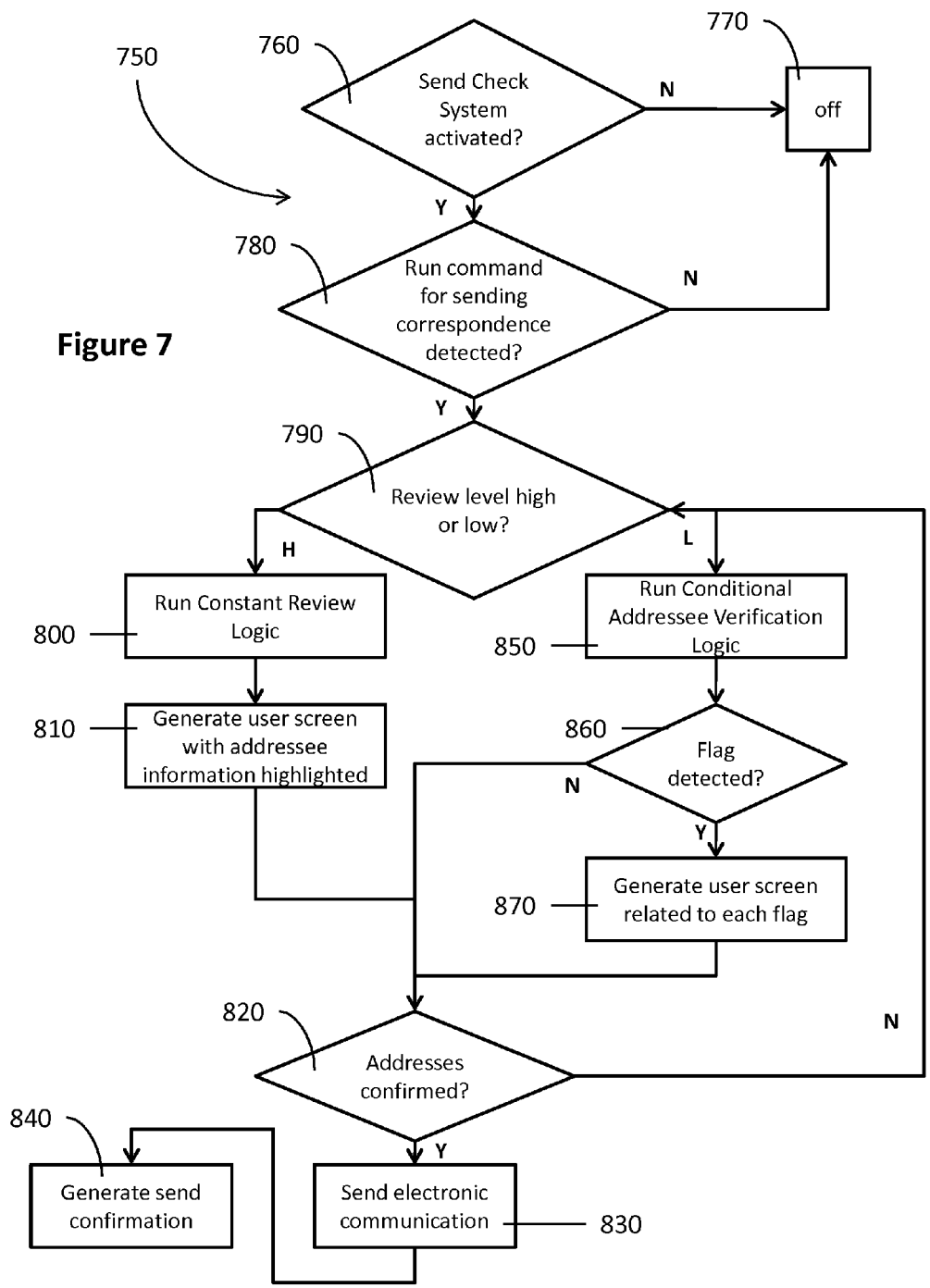
FIG. 7 is a flowchart of an algorithm for verifying a recipient address in an electronic correspondence.
Figure 14:
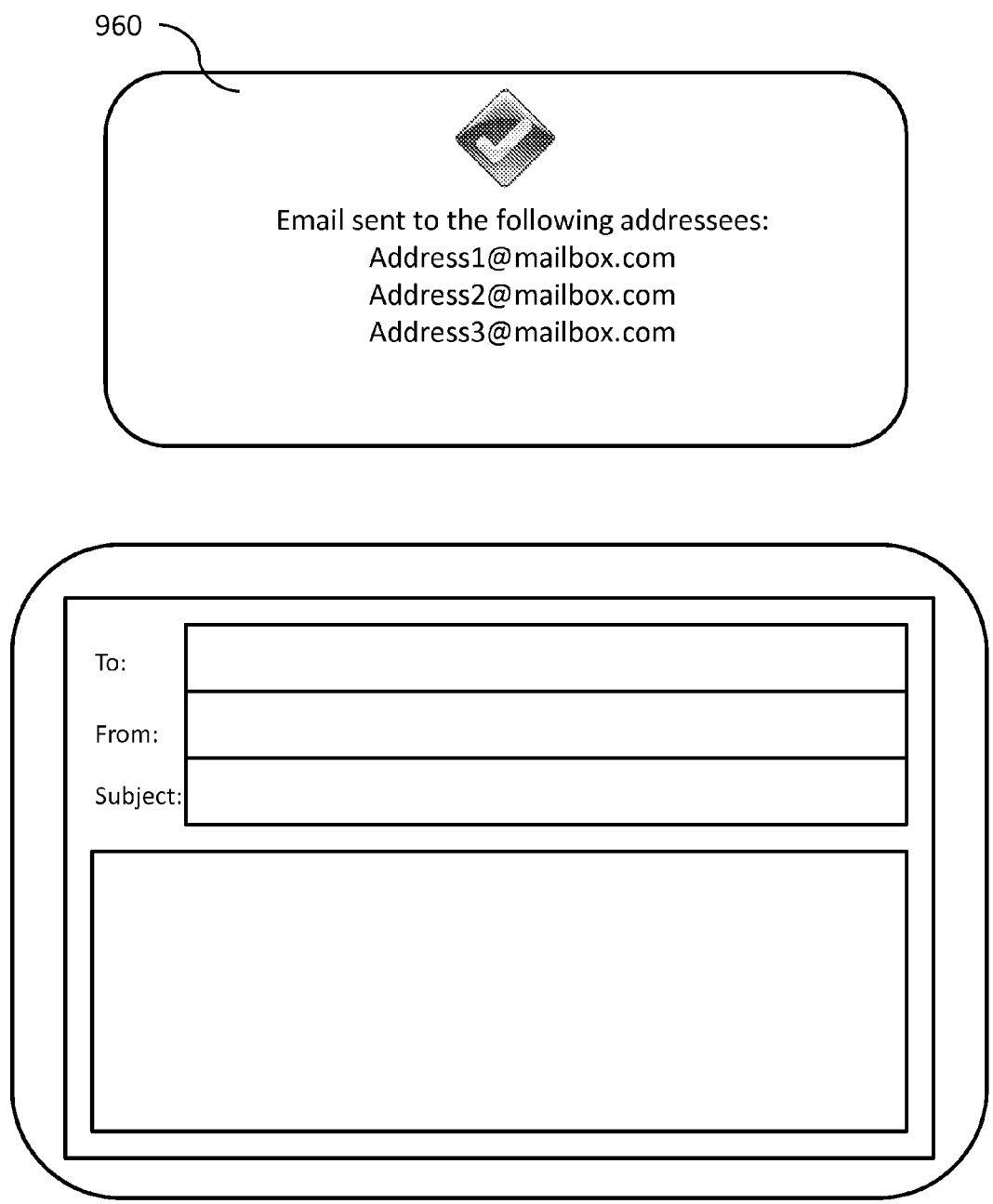
FIG. 14 is an exemplary user interface screen for confirming delivery of electronic correspondence

Referring now to FIG. 7, there is shown therein a method 750 of verifying a recipient address in an electronic correspondence. This particular method 750 includes running multiple verification programs and generating a user screen for verification if any triggers are detected. The triggers are generated by the predetermined address notification reviews (e.g., any one of the logics discussed hereinabove). In this embodiment, the method 750 begins by ensuring that the addressee verification logic (in this case implemented by a Send Check System) is activated at step 760. If not, the program proceeds to step 770. When the program is activated the program waits for an initial send command from the email control logic at step 780. Once the send command is sent the program detects the level of review elected by the user at step 790. Where a user selects a higher review level the constant review logic is executed for each correspondence sent at step 800. Exemplary constant review logic is disclosed and discussed with respect to FIGS. 3 and 8. A user screen is generated at step 810 to highlight and confirm the recipient information for each addressee. Once the addresses are confirmed at step 820 the electronic communication is sent at step 830. A send confirmation screen is generated at step 840 (e.g., 960 as shown in FIG. 14).

If the user selects a lower level of review by the system, the system runs conditional address verification logics at step 850. Several conditional logics are discussed with respect to FIGS. 3 and 9-13. "Conditional" in this application means prompting verification of the addressee information is done when a predetermined condition is met (e.g., an uncommon combination of recipient addresses). Any condition can generate a flag or trigger which the program detects at step 860. If a flag is detected the user is prompted with a verification screen at step 870. Once it is detected that the recipient address is verified at step 820 the electronic communication is sent at step 830. A send confirmation screen is generated at step 840 (e.g., 960 as shown in FIG. 14). The system can include any number of control loops to repeat any of the steps in the given order or in a different sequence where necessary.

The phrase "logic" can be used interchangeably with program, software or algorithm. Logics as discussed herein can be stored within a circuit or system having a processor with memory (e.g., any type of ROM or RAM). The logics can be programmed using any data management software with graphical interface capacity including, for example, C++, html, Java, Pascal, Caretta, or Basic.

Those familiar with the art to which this invention relates will recognize various alternative designs and embodiments for practicing the invention within the scope of the appended claims.

I claim:

1. A computer-implemented method of verifying a recipient address in an electronic correspondence, the method comprising:
   receiving the recipient address in the electronic correspondence;
   running an addressee verification logic configured to verify the recipient address based on the recipient address and a sender address of the electronic correspondence;
   assessing how many characters are shared between an address suffix of the sender address and an address suffix of the recipient address; and
   sending a signal if the address suffix of the sender address and the address suffix of the recipient address have less than a predetermined number of shared characters.

2. A system for verifying a recipient address in an electronic correspondence, comprising:
   a storage device having addressee verification logic configured to verify a recipient address, wherein the addressee verification logic includes:
      suffix review logic configured to review address suffixes of the recipient address and a sender address of the electronic correspondence;
      wherein suffix review logic is further configured to assess how many characters are shared between the address suffix of the sender address and the address suffix of the recipient address; and
   wherein the addressee verification logic is configured to send a signal if the address suffix of the sender address and the address suffix of the recipient address have less than a predetermined number of shared characters.

3. The system of claim 2, wherein the addressee verification logic is further configured to impede the transmission of the electronic correspondence when the signal is sent.

* * * * *